(12) United States Patent
Giles et al.

(10) Patent No.: US 6,857,677 B1
(45) Date of Patent: Feb. 22, 2005

(54) TRAILER SAFETY HANDRAIL SYSTEM AND METHODS

(75) Inventors: Ronald D. Giles, Lino Lakes, MN (US); Thomas C. Sundberg, St. Paul, MN (US)

(73) Assignee: Integris Metals, Inc., Minneapolis, MN (US)

( * ) Notice: Subject to any disclaimer, the term of this patent is extended or adjusted under 35 U.S.C. 154(b) by 0 days.

(21) Appl. No.: 10/804,611

(22) Filed: Mar. 18, 2004

(51) Int. Cl.[7] .................................................. B60P 7/06
(52) U.S. Cl. ......................................... 296/43; 296/36
(58) Field of Search ................................ 296/3, 36, 43

(56) References Cited

U.S. PATENT DOCUMENTS

| | | | |
|---|---|---|---|
| 1,781,208 A | 11/1930 | Youngblood | |
| 2,129,893 A | 9/1938 | Walden | |
| 2,926,021 A | 2/1960 | Altadonna | |
| 3,010,755 A | 11/1961 | Black | |
| 3,747,706 A | 7/1973 | Paine et al. | |
| 3,776,521 A | 12/1973 | Weinert | |
| 3,788,684 A | 1/1974 | Johnson et al. | |
| 4,216,988 A | * 8/1980 | Weiss | 296/43 |
| 4,787,111 A | 11/1988 | Pacek et al. | |
| D307,186 S | 4/1990 | Rogers et al. | |
| 6,131,886 A | 10/2000 | Venegas | |
| 6,152,510 A | * 11/2000 | Newsome | 296/10 |

* cited by examiner

Primary Examiner—Joseph D. Pape
(74) Attorney, Agent, or Firm—Merchant & Gould P.C.

(57) ABSTRACT

A portable safety rail arrangement is sized to be selectively mounted and removed from a flatbed trailer. A flatbed trailer includes a deck and at least one safety rail arrangement that is selectively mountable and removable from the trailer. In certain preferred implementations, there are a plurality of safety rail arrangements provided for the flatbed trailer, which can be arranged to form a continuous fence around the perimeter of the trailer. A method for providing a safety arrangement for a flatbed trailer includes mounting a single-piece safety rail onto the trailer.

20 Claims, 4 Drawing Sheets

TRAILER SAFETY HANDRAIL SYSTEM AND METHODS

TECHNICAL FIELD

This disclosure relates generally to a safety rail system. In particular, this disclosure relates to a portable and quick-mounting safety rail arrangement for use with a flatbed trailer and methods.

BACKGROUND

Flatbed trailers are commonly used for transporting a variety of freight. In many instances, flatbed trailers have open sides and an open end in order to allow for easy access by forklift trucks for loading and unloading. The open sides and open end can present safety hazards. Workers walking on the flatbed trailer can mis-step and fall off the trailer. Systems and methods for improving safety of flatbed trailers are desirable.

SUMMARY

In general, a portable safety rail arrangement is provided. The portable safety rail arrangement is sized to be selectively mounted and removed from a flatbed trailer.

A flatbed trailer is described including a deck and at least one safety rail arrangement that is selectively mountable and removable from the trailer. In certain preferred implementations, there are a plurality of safety rail arrangements provided for the flatbed trailer, which can be arranged to form a continuous fence around the perimeter of the trailer.

In general, a method for providing a safety arrangement for a flatbed trailer is provided. The method includes mounting a single-piece safety rail onto the trailer.

DETAILED DESCRIPTION

Figure 1:
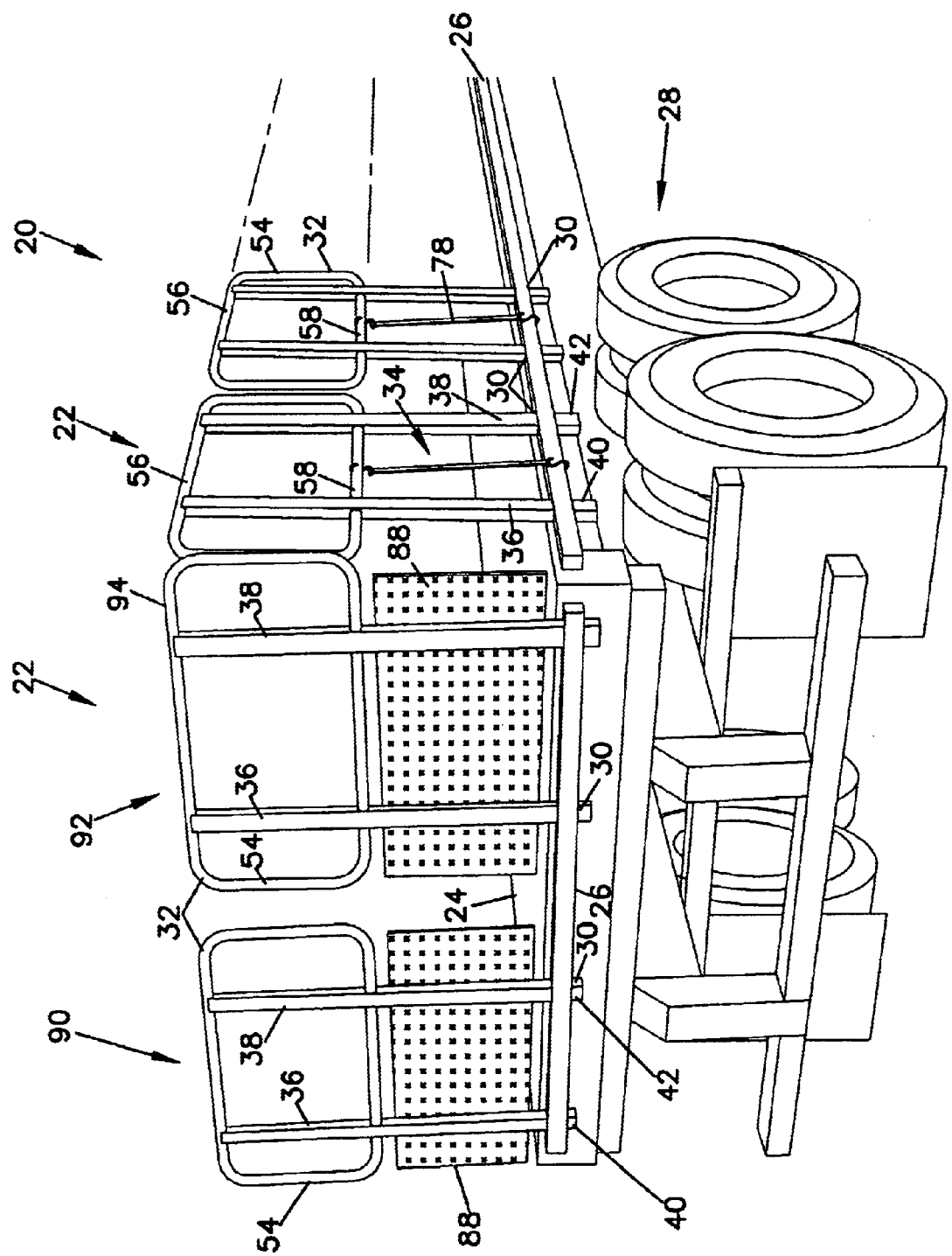
FIG. 1 is a perspective view of one embodiment of a flatbed trailer having a safety rail arrangement mounted thereon, constructed according to principles of this disclosure.
Figure 3:
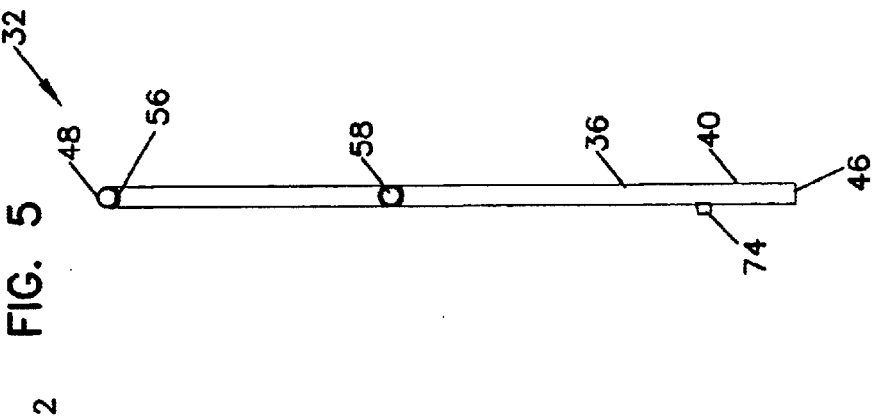
FIG. 3 is a top plan view of the safety rail depicted in FIG. 2.
Figure 4:
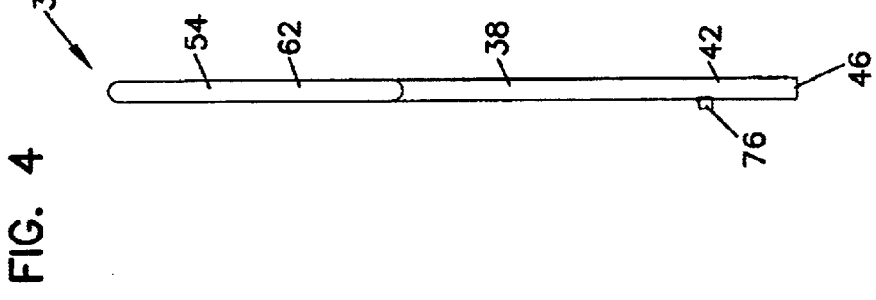
FIG. 4 is a right elevational view of the safety rail depicted in FIG. 2.

Attention is first directed to FIG. 1. In FIG. 1, a flatbed trailer 20 is depicted with a safety rail arrangement 22 mounted thereon. The flatbed trailer 20 is only partially shown in FIG. 1. It should be understood that the flatbed trailer 20 is a conventional, prior art trailer having a deck 24 that is supported by a frame 26. A typical axle and wheel-arrangement 28 supports the deck 24, such that the deck 24 is mobile.

The frame 26 defines a plurality of spaced stake pockets 30. The stake pockets 30 are generally through-holes extending through the frame 26, and are generally spaced from 1.75'–2.25' apart from each other.

In FIG. 1, one embodiment of a safety rail arrangement 22 is depicted. In preferred implementations, the safety rail arrangement 22 is portable, in that it can be easily transported and carried by hand. In preferred arrangements, the safety rail arrangement 22 is lightweight, weighing less than 50 pounds, preferably less than 20 pounds. The safety rail arrangement 22 is selectively mountable and removable from the stake pockets 30 from the flatbed trailer 20. In this way, the safety rail arrangement 22 can be quickly and easily mounted on the frame 26 of the trailer 20 and removed, when desired. For example, during loading or unloading of goods transported on the trailer 20, one or more of the safety rail arrangements 22 can be removed from the flatbed trailer 20.

Reference is now made to FIGS. 2-5. A handrail assembly 32 is depicted in the various views of FIGS. 2-5. The handrail assembly 32 is part of the safety rail arrangement 22 depicted in FIG. 1. The safety rail arrangement 22 of FIG. 1 includes the handrail assembly 32 (FIGS. 2-5) and a retaining mechanism 34 (FIGS. 1 and 6). Various embodiments of the retaining mechanism 34 are described further below. In general, the retaining mechanism 34 functions to secure the handrail assembly 34 to the flatbed trailer 20.

Figure 2:
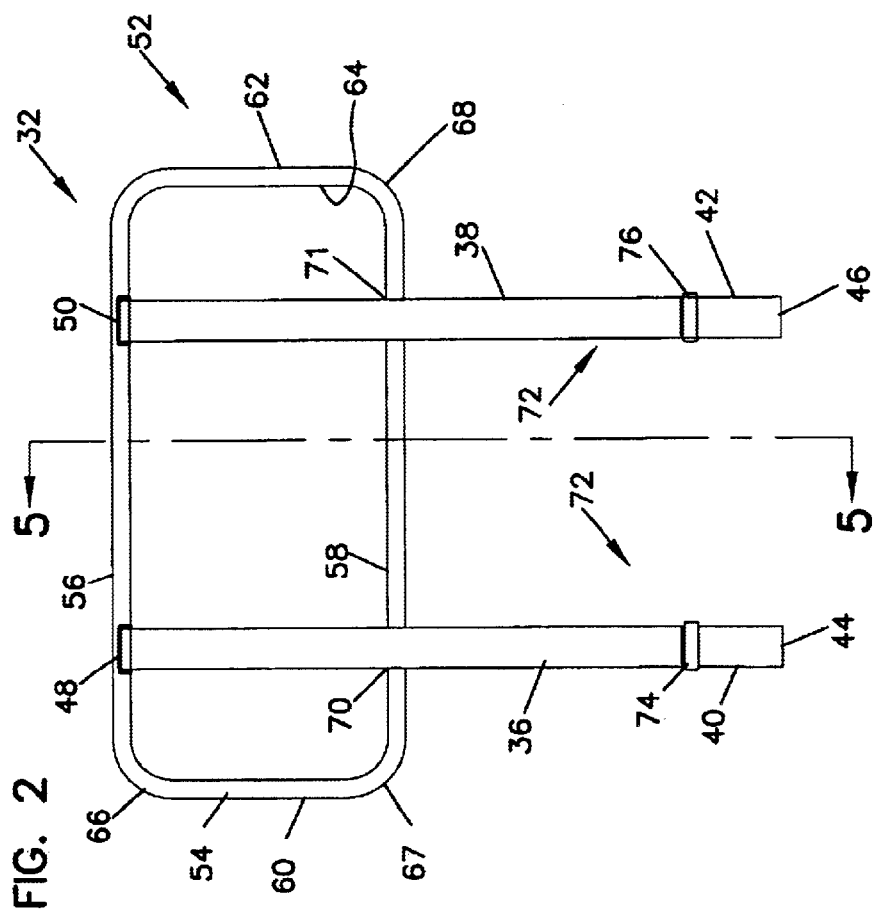
FIG. 2 is a front elevational view of one of the safety rails depicted mounted on the flatbed trailer in FIG. 1.

In FIG. 2, the handrail assembly 32 depicted includes a first post 36 and a second post 38. In the one shown in the drawings, each of the first post 36 and second post 38 is elongate member, generally having a ratio of length to width of 16–17 to 1. In preferred implementations, the first post 36 and second post 38 are an aluminum extrusion. Of course, other materials and manufacturing techniques are useable.

The first post 36 and second post 38 each have a post base 40, 42, each post base 40, 42 defining a respective free end 44, 46. The first post base 40 is sized and configured for the first free end 44 to be selectively insertable and removable from one of the stake pockets 30 in the flatbed trailer 20. Similarly, the second post base 42 is sized and configured for the second free end 46 to be insertable and removable from one of the stake pockets 30 of the flatbed trailer 20. By the term "sized and configured", it is meant that, in general, the first post base 40 and second post base 42 have a size and shape that allow it to be received by a standard sized stake pocket. A standard size stake pocket is rectangular in cross-sectional shape with a width of about 1⅝ inch and a length of about 3.5 inch.

Each of the first post 36 and second post 38, in the embodiment depicted, has a rail end 48, 50 at an end of the post 36, 38 opposite of the free end 44, 46, respectively. As such, in the embodiment depicted, the first post 36 is defined between the first rail end 48 and first free end 44. The second post 38 is defined between the second rail end 50 and second free end 46. In the particular embodiment illustrated, the first post 36 and second post 38 are arranged in the handrail assembly 32 to be parallel to each other.

In general, the handrail assembly 32 includes a handrail 52. In the one shown, the handrail 52 is a closed loop handrail 54. The closed loop handrail 54 is held by the first post 36 and second post 38 to be spaced a distance above the deck 24. In the embodiment depicted, the closed loop handrail 54 is secured to the first post 36 and second post 38 to form the handrail assembly 32. The closed loop handrail 54 is spaced from the first post base 40 and second post base 42. In preferred embodiments, the handrail 54, the first post 36, and the second post 38 are co-planar. This can be seen in FIGS. 4 and 5. The co-planar nature of the handrail assembly 32 is advantageous, in that the assembly 32 results in a smooth, surface that is less likely to be inadvertently caught by cargo or by a forklift truck during loading or unloading.

The handrail 52 can have a variety of configurations. The one depicted is the closed loop handrail 54, mentioned above. As depicted, the closed loop handrail 54 has first and second parallel bars 56, 58 joined by first and second side bars 60, 62, to form a closed loop 64. In the one shown, the closed loop handrail 54 is rectangular-shaped having rounded corners 66, 67, 68, 69. Each rounded corner 66–69 forms the intersection between one of the bars 56, 58 and one of the side bars 60, 62. In the preferred embodiment, the closed loop handrail 54 is a single, aluminum extrusion bent in the form of a rectangular-shaped loop 64 and joined together to form the loop 64.

In the embodiment shown, the first bar 56 of the closed loop handrail 54 is secured to the first post 36 at the first rail end 48. Similarly, the first bar 56 is secured to the second post 38 at the second rail end 50. Further, in the embodiment shown, the second bar 58 is secured to the first post 36 at a position 70 between the first post base 40 and the first rail end 48. Analogously, the second bar 58 is also secured to the second post 38 at a position 71 between the second post base 42 and the second rail end 50.

Figure 5:
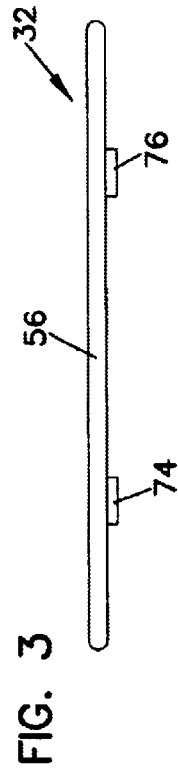
FIG. 5 is a cross-sectional view of the safety rail depicted in FIG. 2, the cross-section being taken along the line 5—5 of FIG. 2.
Figure 6:
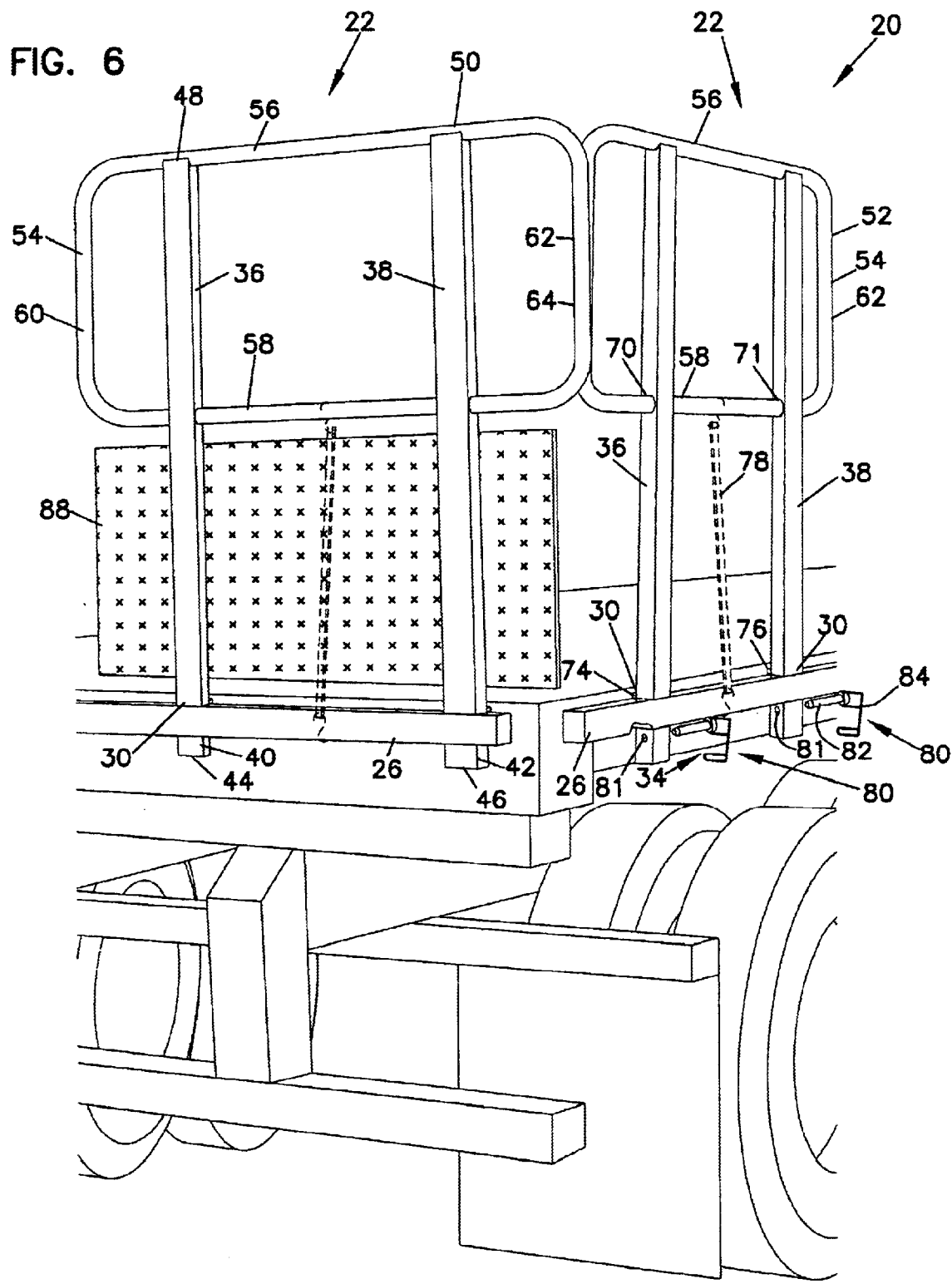
FIG. 6 is an enlarged, perspective view of a portion of the flatbed trailer and safety rail arrangement and further showing use of a locking pin.

In the cross-section shown in FIG. 5, it can be seen how the first bar 56 and second bar 58 are secured to the first post 36 in a manner that results in the first post 36, first bar 56, and second bar 58 to be contained in the same plane. In one useable implementation, the closed loop handrail 54 is secured to the first post 36 and second post 38 by conventional welding techniques.

In many preferred arrangements, the handrail assembly 32 further includes a stop lug arrangement 72 to help secure the handrail assembly 32 to the flatbed trailer 20. In the embodiments shown in FIGS. 2-5, the stop lug arrangement 72 includes a first stop lug 74 and a second stop lug 76. In FIG. 2, the first stop lug 74 is depicted as being secured to the first post 36 adjacent to the first post base 40 and between the first post base 40 and the handrail 54. The second stop lug 76 is depicted as being secured to the second post 38 adjacent to the second post base 42 and between the second post base 42 and the handrail 54. The first stop lug 74 and second stop lug 76 project or extend from each respective post 36, 38 to form a region of enlarged cross-sectional depth at that region of the post 36, 38. Each stop lug 74, 76 can be secured to the post 36, 38 with conventional techniques, such as welding. The region of enlarged cross-sectional depth prevents each post 36, 38 from slipping through its respective stake pocket 30 for more than an intended amount. In particular, each stop lug 74, 76 engages the frame 26, such that each post 36, 38 is allowed to penetrate the stake pocket 30 for the length of its respective base 40, 42. Each respective stop lug 74, 76 introduces a region of increased cross-sectional depth or thickness of the post 36, 38 to prevent each post 36, 38 from further passage through the stake pocket 30.

As mentioned above, in preferred embodiments, the safety rail arrangement 22 includes a handrail assembly 32 and retaining mechanism 34. Various embodiments of the retaining mechanism 34 are next discussed.

In general, the retaining mechanism 34 is provided to be selectively engageable to secure the handrail assembly 32 to the flatbed trailer 20. A variety of implementations can be used. In one embodiment, the retaining mechanism 34 includes a bungee cord 78 to selectively secure the handrail 54 to a portion of the flatbed trailer 20. In FIG. 1, the bungee cord 78 can be seen secured to the second bar 58 of the handrail 54 and the frame 26. The retaining mechanism 34 helps to prevent the handrail assembly 32 from falling out of the stake pockets 30 in the frame 26, if, for example, the trailer 20 engages bumps or vibrations when moving.

Figure 7:
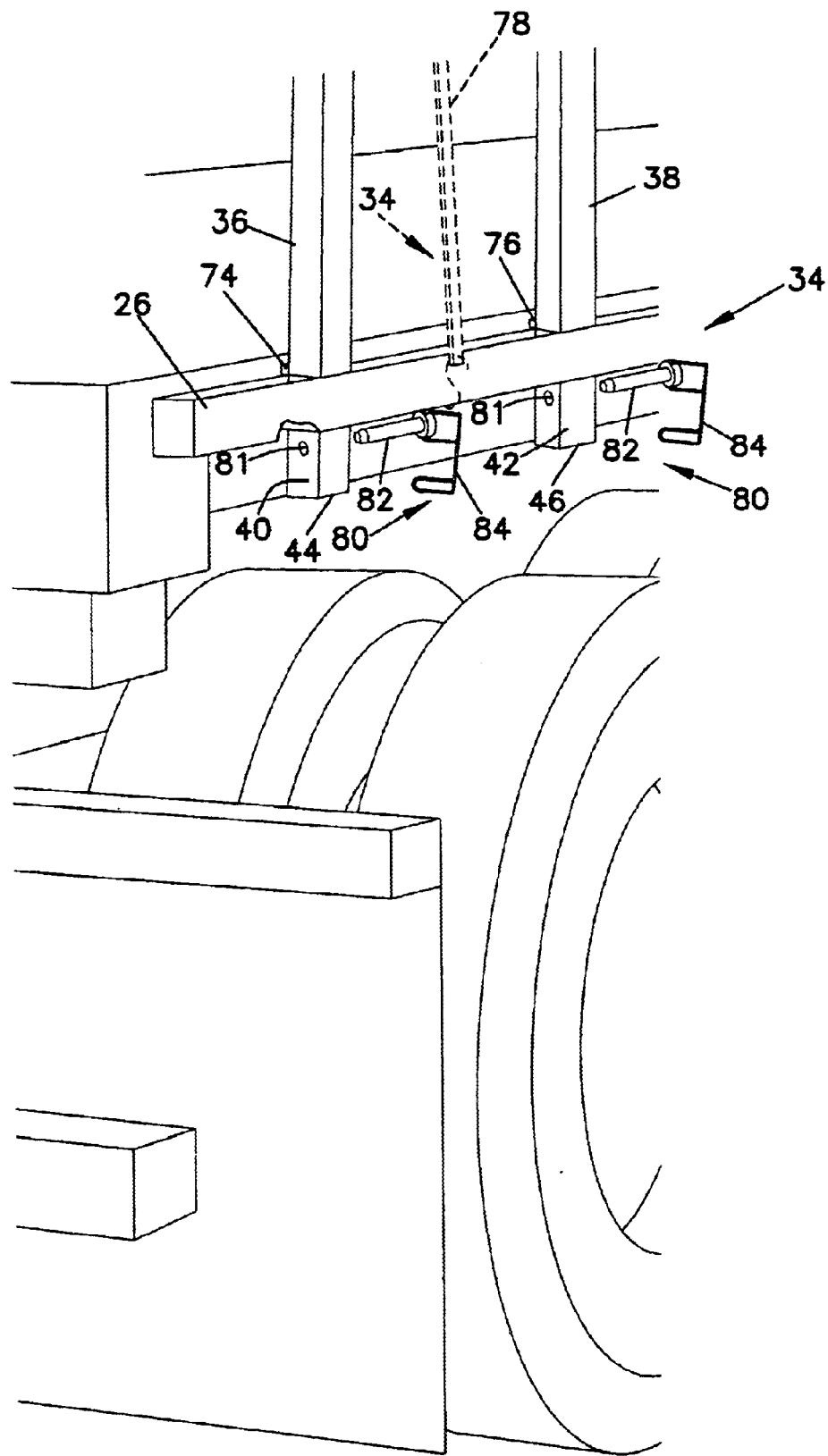
FIG. 7 is an enlarged view of a portion of the locking pins depicted in FIG. 6.

Another implementation of the retaining mechanism 34 includes locking pins 80 (FIGS. 6 and 7). The locking pins 80 can be used in addition to other retaining mechanisms 34, such as bungee cords 78, or alone. The locking pins 80 depicted operate by passing through apertures defined by the first post base 40 and second post base 42. The locking pins 80 include a pin or shaft 82 and a fastening clamp 84. The clamp 84 helps to keep the shaft 82 locked in the apertures 81 during use. As can be seen in FIGS. 6 and 7, the apertures 81 are located in the post base 40, 42 and are positioned from the respective free ends 44, 46 to be positioned below the frame 26. When the handrail assembly 32 is mounted within the frame 26, the frame 26 is trapped between the stop lugs 74, 76 and the locking pins 80. The locking pins 80 help to prevent the handrail assembly 32 from being jolted out of the stake pockets 30 when the trailer 20 is moving.

In some embodiments, the handrail assembly 32 further includes a plate 88. The plate 88 is optionally used for certain of the handrail assemblies 32 to help retain cargo on the flatbed trailer 20 during transport. In preferred embodiments, the plate 88 is not used for all of the handrail assemblies 32, because it interferes with the vision of the driver of the trailer 20. It should be understood, however, that each of the handrail assemblies 32 can have a plate 88, or none of the handrail assemblies 32 can have a plate 88. In the embodiment shown in FIG. 1, the handrail assemblies 32 shown at 90, 92 forming end handrail assemblies 90, 92 each have a plate 88. The plate 88 is positioned such that cargo on the trailer 20 is not allowed to slide out the end of the trailer 20. This is particularly useful if the cargo is long, thin metal tubing, pipes, lumber, and other types of material with a width less than the distance between the posts 36, 38. In the embodiment shown, the plate 88 is secured to the first post 36 and second post 38 at a position between the closed loop handrail 54 and the first post base 40 and second post base 42.

In FIG. 1, it can be seen that in preferred embodiments, the flatbed trailer 20 will include a plurality of safety rail arrangements 22 forming a continuous fence 94 along the frame 26 of the deck 24. Each of the safety rail arrangements 22 are selectively mountable and removable from respective stake pockets 30.

A method for providing a safety arrangement for a flatbed trailer can be practiced utilizing the structures and principles described herein. One described method will refer to the example structures described above and in FIGS. 1-7. First, a single-piece safety rail, such as handrail assembly 32, is mounted onto the flatbed trailer by inserting the first post 36 into one stake pocket of the trailer 20 and the second post 38 into a second stake pocket until stop lugs 74, 76 on the handrail assembly 32 engage a portion of the flatbed trailer. Next, the safety rail is releasably fastened to the flatbed trailer 20.

In one implementation, the step of releasably fastening the safety rail to the flatbed trailer 20 includes inserting locking pin 80 into each of the first post 36 and second post 38. The step of releasably fastening can also include, either separately or in addition to the locking pin, attaching bungee cord 78 to the handrail assembly 32 in the flatbed trailer 20.

The method can include forming a fence 94 around an edge of the flatbed trailer 20 by mounting a plurality of the single-piece handrail assemblies 32. Each of the handrail assemblies 32 are mounted by inserting respective first post 36 into one stake pocket and respective second post 38 into a second stake pocket until stop lugs 74, 76 on each respective handrail assembly 32 engage a portion of the flatbed trailer 20. The portion of the flatbed trailer 20 that is engaged can be the frame 26, as shown in FIG. 7. In preferred embodiments, for each handrail assembly 32, the closed loop handrail 54, the first post 36, and the second post 38 of each respective handrail assembly 32 is co-planar. As discussed above, this leads to advantages when loading and unloading cargo from the flatbed trailer 20. Each of the plurality of handrail assemblies 32 can then be releasably fastened to the trailer 20.

Example Materials and Dimensions

Described below is one example implementation of useable materials and dimensions for handrail assembly 32. It should be understood that a wide variety of materials, dimensions, and implementations are available. This is only one useable example.

Each of the posts 36, 38 can be made from aluminum, rectangular tubing, 3 in×1.5 in×0.125 in thick wall. The closed loop handrail 54 can be made of aluminum extruded tubing, 1.5 in outside diameter by 0.125 in thick wall. Each of the stop lugs 74, 76 can be made of aluminum bar, 1 in×0.75 in×3.5 in long.

The distance between the first post 36 and second post 38 can be 1.75 ft–2.25 ft, preferably 2 ft. The distance between the free ends 44, 46 and the rail ends 48, 50 (also, the first bar 56) can be 3.5 ft–4.5 ft, preferably about 4 ft. The distance between the first bar 56 and second bar 58 can be about 1.5 ft.–2 ft, preferably about 1.75 ft. The distance between the free ends 44, 46 and the stop lugs 74, 76 can be about 4 in–10 in, preferably about 6 in.

It should be understood that many embodiments can be made, following the principles discussed in this disclosure.

We claim:

1. A portable safety rail arrangement sized to be selectively mounted and removed from stake pockets in a flatbed trailer; the safety rail arrangement comprising:
   (a) a first post having a first post base defining a first free end;
      (i) the first post base being sized and configured for the first free end to be selectively insertable and removable from a stake pocket of a flatbed trailer;
   (b) a second post, spaced from the first post, and having a second post base and defining a second free end;
      (i) the second post base being sized and configured for the second free end to be selectively insertable and removable from a stake pocket of a flatbed trailer;
   (c) a closed loop handrail secured to the first post and the second post to form an assembly; the handrail being spaced from the first post base and second post base;
      (i) the handrail, the first post, and the second post being co-planar; and
   (d) a retaining mechanism selectively engageable to secure the first post, second post, and handrail assembly to a flatbed trailer.

2. A portable safety rail arrangement according to claim 1 further comprising:
   (a) a first stop lug secured to the first post adjacent to the first post base and between the first post base and the handrail; and
   (b) a second stop lug secured to the second post adjacent to the second post base and between the second post base and the handrail.

3. A portable safety rail arrangement according to claim 1 wherein:
   (a) the retaining mechanism comprises first and second pins;
      (i) the first pin being selectively insertable and removable from an aperture through the first post base; and
      (ii) the second pin being selectively insertable and removable from an aperture through the second post base.

4. A portable safety rail arrangement according to claim 1 wherein:
   (a) the retaining mechanism comprises a bungee cord selectively securing the handrail to a portion of the flatbed trailer.

5. A portable safety rail arrangement according to claim 1 further comprising:
   (a) a plate secured to the first post and the second post at a position between the handrail and the first post base and second post base.

6. A portable safety rail arrangement according to claim 1 wherein:
   (a) the handrail is rectangular-shaped with rounded corners.

7. A portable safety rail arrangement according to claim 6 wherein:
   (a) the first post has a first rail end opposite of the first free end;
   (b) the handrail has first and second parallel bars;
      (i) the first bar being secured to the first post at the first rail end; and
      (ii) the second bar being secured to the first post at a position between the first post base and the first rail end;
   (b) the second post has a second rail end opposite of the second free end;
      (i) the first bar being secured to the second post at the second rail end; and
      (ii) the second bar being secured to the second post at a position between the second post base and the second rail end.

8. A portable safety rail arrangement according to claim 7 wherein:
   (a) the first post and second post are spaced apart by a distance of 1.75–2.25 feet;
   (b) the first bar of the handrail is spaced a distance of 3.5–4.5 feet from the first free end and second free end; and
   (c) the first bar and second bar of the handrail are spaced apart by a distance of 1.5–2.0 feet.

9. A portable safety rail arrangement according to claim 8 wherein:
   (a) the first post, second post, and handrail comprise aluminum extrusions; and
   (b) the arrangement has a weight not greater than 20 lbs.

10. A portable safety rail arrangement according to claim 9 wherein:
   (a) the retaining mechanism comprises first and second pins;
      (i) the first pin being selectively insertable and removable from an aperture through the first post base;
      (ii) the second pin being selectively insertable and removable from an aperture through the second post base.

11. A flatbed trailer comprising:
(a) a wheel-supported deck having a frame; the frame defining a plurality of spaced stake pockets; and
(b) at least one safety rail arrangement being selectively mountable and removable from the stake pockets; the safety rail arrangement comprising:
  (i) a first post having a first post base defining a first free end;
    (A) the first post base being sized and configured for the first free end to be selectively insertable and removable from one of the stake pockets;
  (ii) a second post, spaced from the first post, and having a second post base and defining a second free end;
    (A) the second post base being sized and configured for the second free end to be selectively insertable and removable from another one of the stake pockets;
  (iii) a closed loop handrail secured to the first post and the second post to form an assembly; the handrail being spaced from the first post base and second post base;
    (A) the handrail, the first post, and the second post being co-planar; and
  (iv) a retaining mechanism selectively engageable to secure the first post, second post, and handrail assembly to the frame.

12. A flatbed trailer according to claim 11 wherein:
(a) the safety rail arrangement further includes:
  (i) a first stop lug secured to the first post adjacent to the first post base and between the first post base and the handrail;
    (A) the first stop lug engaging the frame and preventing the first post from slipping through the respective stake pocket;
  (i) a second stop lug secured to the second post adjacent to the second post base and between the second post base and the handrail;
    (B) the second stop lug engaging the frame and preventing the second post from slipping through the respective stake pocket.

13. A flatbed trailer according to claim 12 wherein:
(a) the retaining mechanism includes first and second pins;
  (i) the first pin being selectively insertable and removable from an aperture through the first post base;
    (A) the frame being between the first stop lug and the first pin;
  (ii) the second pin being selectively insertable and removable from an aperture through the second post base;
    (A) the frame being between the second stop lug and the second pin.

14. A flatbed trailer according to claim 11 wherein:
(a) the retaining mechanism comprises a bungee cord extending between the handrail and the frame.

15. A flatbed trailer according to claim 11 wherein:
(a) the safety rail arrangement further includes:
  (i) a plate secured to the first post and the second post at a position between the handrail and the first post base and second post base.

16. A flatbed trailer according to claim 11 further wherein:
(a) the at least one safety rail arrangement includes a plurality of safety rail arrangements forming a continuous fence along the frame of the deck; each safety rail arrangement being selectively mountable and removable from respective stake pockets; each of the safety rail arrangements comprising:
  (i) a first post having a first-post base defining a first free end;
    (A) the first post base being sized and configured for the first free end to be selectively insertable and removable from one of the stake pockets;
  (ii) a second post, spaced from the first post, and having a second post base and defining a second free end;
    (A) the second post base being sized and configured for the second free end to be selectively insertable and removable from another one of the stake pockets;
  (iii) a closed loop handrail secured to the first post and the second post to form an assembly; the handrail being spaced from the first post base and second post base;
    (A) the handrail, the first post, and the second post being co-planar; and
  (iv) a retaining mechanism selectively engageable to secure the first post, second post, and handrail assembly to the frame.

17. A method for providing a safety arrangement for a flatbed trailer; the trailer having a plurality of stake pockets; the method comprising:
(a) mounting a single-piece safety rail onto the flatbed trailer by inserting a first post into one stake pocket and a second post into a second stake pocket until stop lugs on the safety rail engage a portion of the flatbed trailer;
  (i) the safety rail including a closed loop handrail secured to the first post and the second post;
  (ii) the handrail, the first post, and the second post being co-planar; and
(b) releasably fastening the safety rail to the flatbed trailer.

18. A method according to claim 17 wherein:
(a) the step of releasably fastening includes inserting a pin into each of the first post and second post.

19. A method according to claim 17 wherein:
(a) the step of releasably fastening includes attaching a bungee cord to the safety rail and the flatbed trailer.

20. A method according to claim 17 further comprising:
(a) mounting a plurality of single-piece safety rails onto the flatbed trailer to form a fence around an edge of the flatbed; each of the single-piece safety rails being mounted by inserting a respective first post into one stake pocket and a respective second post into a second stake pocket until stop lugs on each respective safety rail engage a portion of the flatbed trailer;
  (i) each of the safety rails including a closed loop handrail secured to a respective first post and second post;
  (ii) the handrail, the first post, and the second post of each respective safety rail being co-planar; and
(b) releasably fastening each of the safety rails to the flatbed trailer.

* * * * *